3,342,748
STABLE ALKALINE COLLOIDAL SILICA SOLS OF LOW VISCOSITY AND PROCESSES FOR PREPARING SAME

Ralph Marotta, St. Louis, Mo., assignor to Monsanto Company, a corporation of Delaware
No Drawing. Filed Apr. 27, 1964, Ser. No. 362,943
18 Claims. (Cl. 252—313)

The present invention relates to novel silica sols and to processes for preparing such sols. More particularly the invention is concerned with alkaline silica sols having a low viscosity and containing high concentrations of colloidal silica and which are stable against gelation for prolonged periods of time. The invention further relates to novel processes by which these novel sols may be prepared.

Aqueous colloidal silica sols have been known for a number of years and have been the subject of scientific investigation and industrial usage. These known commercially available sols have generally consisted of amorphous particles of colloidal silica dispersed in water and such sols contained up to 35% by weight of $SiO_2$ in the form of such particles and were substantially free of electrolytes. The desirability of silica sols containing concentrations higher than 35% by weight of $SiO_2$ has long been recognized but the instability of such sols, even when free of electrolytes, as well as difficulties in the preparation of these sols have prevented them from becoming commercially available. Generally, sols which contain more than 35% by weight of silica are initially viscous and are unstable, that is, they become more viscous and/or tend to form gels upon standing for relatively short periods, e.g., for periods of less than one month.

It has been proposed heretofore to provide silica sols containing up to about 50% by weight of silica particles by making the sols substantially free of electrolytes. In U.S. Patents 2,577,484 and 2,577,485, issued Dec. 4, 1961, to Joseph M. Rule, there are described methods for making and obtaining such electrolyte free sols. U.S. Patent 2,515,949, issued July 18, 1950, to Vincent Di Maio, and U.S. Patent 2,515,960, issued July 18, 1950, to Morris D. Marshall, also describe sols of relatively low electrolyte content.

It has also been proposed in U.S. Patent 2,573,743, issued Nov. 6, 1951, to Henry S. Trail, to prepare alkaline silica aquasols containing about 30% colloidal silica (which also have a relatively low electrolyte content) by a process which comprises mixing alkaline reacting silica aquasols with from 1% to 4% by weight of "ionic silica" (e.g., an aqueous solution of sodium silicate) and thereafter passing the mixture through a bed of cation exchange mineral or resin to remove the sodium ions of the sodium silicate from the aqueous liquid and to form silicic acid anions in the aqueous phase. Thereafter, the silica sol containing silicic acid anions (e.g., the effluent passing through the cation exchange bed) is heated above 100° C. for a period of time sufficient to convert the ionic silica to colloidal silica. In other words the Trail patent increases the silica content of silica sols by mixing such sols with alkali metal silicate, removing alkali metal cations from the resulting mixture by means of cation exchange and thereafter converting the silicic acid anions formed to polysilicic acid, e.g., colloidal silica particles.

However, when the low electrolyte sols described in the aforementioned Rule, Di Maio, Marshall and Trail patents contain more than about 35% by weight of colloidal silica particles such sols usually have a high initial viscosity (e.g., above 50 centipoises at 25° C.) which tends to increase on storage under ordinary conditions. The increase in viscosity is often such that low electrolyte sols often lose their liquidity and become gels and when in such condition are disadvantageous for applications in which such sols are generally employed.

It has further been proposed in U.S. Patent 3,012,973, issued Dec. 12, 1961, to Robert C. Atkins, to provide sols containing more than 35% of $SiO_2$ by including controlled quantities of salts (e.g., electrolytes) in alkali stabilized silica aquasols of specific ratio (e.g., $SiO_2$ to $Na_2O$) particular surface area and concentration. According to this patent sols containing up to about 50% by weight of $SiO_2$ can be prepared when the water in which the silica particles are dispersed contains a maximum of 0.050 equivalent of a soluble salt per liter of water. These sols contain amorphous silica particles which have a surface area of from about 60 to about 300 square meters per gram. Stated differently the sols of Atkins are composed of silica particles having an average particle size in the range of about 20 to about 60 millimicrons and contain a maximum of 0.050 equivalent of electrolyte per liter of water present in the sols.

However, the sols described by Atkins which have a silica content of more than 40% and an electrolyte concentration of 0.02 to 0.05 equivalent of salt per liter of water are disadvantageous in that they also are characterized in having a relatively high viscosity above 50 centipoises at 25° C. Such viscosity, which is from about 50 to about 70 times greater than water, results in such highly concentrated sols being difficult to handle, that is, to pump and to mix with other ingredients, in industrial formulations.

In accordance with the present invention it has been found possible to provide stable low viscosity sols containing up to 52%, preferably 39% to 52%, by weight of colloidal silica when such sols contain from about 0.055 to about 0.095 equivalent, per liter of liquid, of an electrolyte and when such sols also contain from about 0.01% to 1.0% by weight, based on the weight of the liquid phase, of a water soluble salt consisting of a metal cation and a silicon oxide containing anion. Such sols are also characterized in having a relative viscosity which is below 35 centipoises and often below 10 centipoises at 25° C.

The novel sols of the present invention are generally advantageous in that they provide high concentrations of silica, are stable toward gelation during storage and overcome the problem of high viscosity inherent in previously known sols having a comparable silica content.

It is, accordingly, one object of the present invention to provide novel, stable, aqueous alkaline silica sols which are characterized in having a high concentration of silica, a low viscosity and in being stable against gelation during storage.

It is another object of this invention to provide processes for preparing these novel concentrated silica sols.

Other objects and advantages of the present invention will become apparent from the following description and the appended claims.

The present invention provides stable alkaline colloidal silica sols comprising (1) a colloidal silica disperse phase consisting of substantially from about 39% to about 52% by weight, based on the weight of the sol, of amorphous silica particles having a particle size in the range of from about 15 to about 75 millimicrons and (2) a continuous liquid phase comprising an aqueous solution having dissolved therein from about 0.055 to about 0.095 equivalent per liter of said liquid phase of a water soluble metal salt of a mineral acid (hereinafter sometimes referred to as Salt I) and from about 0.01% to about 1.0% by weight, based on the weight of the liquid phase, of a water soluble salt consisting of a metal cation and a silicon oxide containing anion (hereinafter sometimes referred to as Salt II) which last mentioned salt is preferably a water soluble alkali metal silicate. Sols so prepared are characterized in having a relative viscosity below about 35 centipoises at 25° C., an $SiO_2:M_2O$ ratio of from about 75:1 to 350:1 where M is an alkali metal, a pH in the range of from about 8.8 to about 9.9 and a specific conductance, depending upon the concentration of electrolyte present in the liquid or aqueous phase of the sol, in the range of from about 5400 to about 6800 micromhos at 25° C. These sols are also stable, that is, they do not undergo an appreciable increase in viscosity and do not tend to gel when stored under ordinary conditions for periods of 6 months or longer. Concentrated silica sols falling within the above-described class and which are especially advantageous are sols in which the water soluble salt of a mineral acid (e.g. Salt I) is an alkali metal sulfate, preferably sodium or potassium sulfate. Concentrated silica sols which are advantageous are sols in which the water soluble salt consisting of a metal cation and a silicon oxide containing anion (e.g. Salt II) is an alkali metal silicate preferably a sodium or a potassium silicate.

The sols of the present invention generally fall within two groups, the particular group desired depending upon the end use of the sol. One group of sols falling within the above described class (hereinafter sometimes referred to as clear sols) comprise sols having a colloidal silica disperse phase in which the silica particles have an average particle size in the range of from about 15 to about 30 millimicrons. These sols are substantially clear, transparent liquids and are suitable, for example, for use in floor waxes to prepare wax formulations which provide a slip-resistant film or finish.

Another group of sols falling within the above-described general class are sols (hereinafter sometimes referred to as milky sols) which comprise a colloidal silica disperse phase in which the silica particles have an average particle size in the range of from about 35 to about 75 millimicrons. Such sols are usually non-transparent and are useful, for example, in frictionizing paper and in frictionizing fibers in the manufacture of textiles.

The water soluble metal salt of a mineral acid which is dissolved in the aqueous liquid phase of the novel silica sols of this invention may be any water soluble metal salt of a mineral acid. Examples of such salts include water soluble metal chlorides, sulfates, nitrates, phosphates, carbonates and the like. The metal moiety of such salts may be an alkali metal such as for example lithium, sodium, potassium, cesium and rubidium or an alkaline earth metal such as aluminum or magnesium. However, alkali metal salts have been found to be advantageous and alkali metal chlorides and sulfates have been found to be especially advantageous.

The concentration of the above salts which may be dissolved in the aqueous liquid phase of the silica sols of this invention may vary to some extent, but it is essential that the concentration of such dissolved salts be within the range of from about 0.055 to about 0.095 equivalent per liter of aqueous liquid. If the concentration of Salt I, is less than about 0.055 equivalent per liter the sols will usually have a relative viscosity above 35 centipoises at 25° C. On the other hand if the concentration of the Salt I is greater than about 0.095 equivalent per liter of aqueous liquid the sols, although having a low initial viscosity, will usually tend to increase in viscosity and in some instances will gel during storage.

The preferred concentration of Salt I in the aqueous liquid phase of the sols depends to some extent upon the amount of colloidal silica and the size of the colloidal silica particles. Sols having larger silica particles, that is the milky sols, may, in general, have higher concentrations of electrolyte (e.g. Salt I) in the sol. Thus, for example, where a clear sol contains from about 39% to about 44% by weight of colloidal silica particles, such sols preferably contain from about 0.070 to about 0.095 equivalent of Salt I per liter of aqueous liquid. On the other hand where the colloidal silica concentration of such sol is in the range of from about 45% to about 52% by weight the concentration of salt will be in the range of from about 0.055 to about 0.070 equivalent per liter. The Salt I content of milky sols of this invention is, in general, not dependent upon the concentration of silica particles.

Advantageous sols falling within the group whose silica particles have an average particle size of from about 15 to 30 millimicrons, that is, the clear sols, are also characterized in having a relative viscosity of from about 7 to about 31, preferably from about 15 to 25, centipoises at 25° C., a pH in the range of from about 8.8 to about 9.5 and have a liquid phase which preferably contains from about 0.055 to about 0.070, preferably 0.058 to 0.063, equivalent of alkali metal sulfate per liter of aqueous liquid. Advantageous sols which are composed of silica particles having a average particle size in the range of from about 35 to about 75, preferably about 45 to 65, millimicrons, that is, the milky sols, are characterized in having a relative viscosity at 25° C. of from between about 7 to about 20, preferably about 9 to 18, centipoises at 25° C., a pH in the range of from about 9.3 to about 9.9 and generally contain from about 0.055 to about 0.095, preferably 0.058 to 0.063 equivalent of alkali metal sulfate, preferably sodium sulfate, per liter of aqueous liquid.

The amount of the water soluble salt consisting of a metal cation and a silicon oxide containing anion (e.g. Salt II) which is included in the novel silica sols of this invention may vary within the range of from about 0.01% to about 1.0% by weight, based on the aqueous liquid, depending upon several, hereinafter described, factors. Generally, the sols of this invention which contain less than 0.01% by weight of such water soluble salt, preferably an alkali metal silicate, will not be stable against gelation upon storage for prolonged periods of time. On the other hand, sols which contain more than 1% by weight of such salt tend to have an alkalinity which is too high (e.g. often about pH 10) for advantageous use of the sols. Surprisingly, and unpredictably, omission of the small quantities of metal salts consisting of the metal cation and the silicon oxide containing anion will render such silica sols unstable with respect to gelation. Moreover (and also surprisingly) if the Salt I content is reduced (and the Salt II is absent) sols similar to those described in the aforementioned Atkins patent, e.g. sols which have a high relative viscosity, e.g. a viscosity above about 50 centipoises at 25° C., will be obtained.

Advantageous sols which are composed of silica particles having the aforedescribed smaller particle size range of the sols of this invention usually contain from about 0.01 to about 0.5% by weight, based on the weight of the liquid phase, of dissolved Salt II. Advantageous sols which are composed of silica particles in the larger size range generally may contain from about 0.01% to about 1.0% by weight, based on the weight of the liquid, of dissolved Salt II.

The novel silica sols of this invention may be prepared by a process which comprises removing liquid from an alkaline silica sol containing from about 5% to about 35% by weight of colloidal silica particles having a particle size in the range of from about 15 to about 75 millimicrons, said particles being dispersed in a liquid aqueous medium comprising a solution of a sufficient quantity of water, Salt I and Salt II to provide, after the removal of said liquid, an alkaline silica sol comprising (1) from about 39% to about 52% by weight of colloidal silica particles having a particle size within said range and dispersed in (2) an aqueous liquid phase having dissolved therein from about 0.055 to about 0.095 equivalent per liter of said liquid phase, of Salt I and from about 0.01% to about 1.0% by weight, based on the weight of the liquid phase, of Salt II.

THE STARTING SOLS

The aqueous alkaline silica sol, hereinafter referred to as the starting sol, from which liquid may be removed in accordance with the processes of this invention, may be obtained by adding the proper amounts of any of the hereinbefore described water soluble salts of mineral acids or mixtures of such salts (Salt I) and a water soluble salt consisting of a metal cation and a silicon oxide containing anion (Salt II) to almost any alkaline silica sol such as, for example, the sols described in the hereinbefore mentioned Rule, Di Maio, Marshall or Trail patents (e.g. silica sols containing from about 5% to about 30% $SiO_2$). The amounts of Salt I and Salt II which may be added to the starting sols will vary depending upon a variety of factors such as the colloidal silica concentration in the starting sol, the desired concentration of silica in the finished sol, and whether or not the sol will be a clear sol or a milky sol. Generally, the amount of Salt I will be an amount sufficient to provide a concentration in the range of from about 0.027% to about 0.6% by weight, based on the liquid phase of the starting sol, and the Salt II added to the starting sol will be an amount of from about .0008% to about 0.8% by weight, based on the liquid in the starting sol.

The above-described salts may be added prior to the removal of the liquid or at any time during the removal of the liquid and it is preferred, as will be hereinafter evident, to add such salts prior to the removal of the liquid from the starting sol.

The liquid may be removed from the starting sols in a batch or in a semi-continuous manner. For example a given quantity of starting sol may be evaporated to the desired concentration. Alternatively, fresh starting sol may be continuously added to a sol which has been partially evaporated, until relatively large quantities of finished sol are produced. The removal of water may be accomplished by evaporation such as by boiling off or by distillation and is preferably removed by distillation.

Although the above-mentioned salts may be added per se to the starting sols as above described it has been found particularly advantageous to form starting sols similar to previously known sols but which contain the proper concentrations of the hereinbefore described salts.

Thus, by way of example, it has been found most advantageous to remove water from stable alkaline silica sols obtained by alkalizing an acidic silica hydro-organosol containing a water soluble salt of a mineral acid with an aqueous solution of an alkali metal silicate having certain concentrations of silica and certain pH values, as will be explained in greater detail hereinafter, provided such silicate solution is sufficiently hot to distill off the organic liquid present in the hydro-organosol and provided also that such hydro-organosol contains an amount of water soluble metal salt of a mineral acid to provide a finished sol of this invention having the concentration hereinbefore defined and provided further that sufficient silicate solution is present in a volume and concentration such as to insure the hereinbefore defined concentration of a water soluble salt consisting of a metal cation and a silicon oxide anion, e.g. an alkali metal silicate in the concentrated sol of this invention.

PREPARATION OF STARTING SOLS

The starting sols referred to may be advantageously prepared by adding an acidic silica hydro-organosol containing a substantially neutral water miscible organic liquid having a boiling point below that of water at atmospheric pressure, about 4% to about 12% by weight of silica as silicic acid and from about 0.027% to about 0.140% by weight of any of the aforedefined water soluble mineral acid salts to an aqueous solution of an alkali metal silicate having a pH of from about 10.5 to about 11.3 at 25° C. (glass electrode) and containing from about 0.5% to about 2.5% by weight of $SiO_2$ which silicate solution is at a temperature sufficiently high to cause distillation of such organic liquid from the resulting mixture, and subsequently removing substantially all of such organic liquid by distillation and sufficient water by evaporation to provide a final silica aquasol having the properties and components hereinbefore defined.

PREPARATION OF ACIDIC SILICA HYDRO-ORGANOSOLS

The acidic silica hydro-organosol employed can be prepared in a variety of ways, but is suitably prepared by first forming an acidic silica hydro-organosol containing from about 0.1% to about 0.4%, preferably about 0.075% to 0.2% by weight of a salt, for example, by processes similar to those described in the United States Patent No. 2,285,477 to John F. White, patented June 9, 1942, or United States Patent No. 2,285,449 to Morris D. Marshall, patented July 9, 1942. The processes of these patents comprise, in general, first forming an acidic sol having a pH of between 1.8 and 4.5 by acidifying a water soluble alkali silicate such as sodium silicate with a mineral acid such as sulfuric acid in the proper proportions to give such a pH, and then adding a water miscible organic liquid such as ethanol to the resulting aquasol to precipitate a substantial amount of the salt formed by the reaction of the silicate and the acid as in the above noted Marshall patent, or the resulting hydro-organosol may be cooled to precipitate further quantities of the salt as in the above White patent. The precipitated salt is then separated from the sol by any suitable separation procedure such as filtration, centrifugation and the like to form sols containing from about 0.05% to 0.4% preferably 0.075% to 0.2% by weight of a salt such as for example sodium sulfate or sodium chloride. Lower salt concentrations are obtained by cooling the hydro-organosols to from 0° C. to —20° C. These hydro-organosols are usually prepared at temperatures between —20° C. and +15° C. but are preferably prepared at a temperature between —10° C. and +10° C. and generally contain 0.075% to 0.2% by weight of salt at the preferred temperatures. The hydro-organosols preferably have a pH between 2 and 4 and an $SiO_2$ content as silicic acid of from about 5 to 12% preferably 8 to 10.5% by weight. The residual salt content of such sols may be further reduced by procedures described hereinafter and the resulting sol may then be employed in the processes of this invention.

A preferred procedure for preparing acidic silica hydro-organosols of the type referred to in the preceding paragraph comprises first reacting an aqueous solution of sodium silicate and aqueous sulfuric acid at a temperature between about 0° C. and 15° C. in such proportions and concentrations to provide an acidic silica aquasol having a pH of about 2 to 4 and containing sodium sulfate and from about 12% to 20% by weight of $SiO_2$ as silicic acid. The acidic aquasols having a silica content over 17% by weight generally must be kept at from 0° C. to 5° C. to prevent rapid gelation. The acidic silica aquasol thus obtained is maintained at a temperature of above 0° C. to 15° C. and a substantially neutral water miscible organic liquid having a boiling point below that of water at atmospheric pressure, for example a liquid such as ethanol is mixed therewith to form a silica hydro-organosol containing from about 25% to 60% by weight, preferably 40% to 60% by weight of the organic liquid and from about 5% to 11% by weight of $SiO_2$ as silicic acid. The sodium sulfate is only partially soluble in such sol and a substantial portion is precipitated as

$$Na_2SO_4 \cdot 10H_2O$$

On removal of this precipitated sodium sulfate by centrifugation, decantation or filtration of the sol or the like a sol is obtained which contains from about 0.05% to 0.4% of sodium sulfate depending on the concentration of the organic liquid in the sol and the temperature of the sol. It is usually not possible to reduce the sodium sulfate content of the sol appreciable below 0.075% by weight by increasing the organic liquid concentration or by cooling the sol to a temperature just above the freezing point of the sol or by using both of these procedures, although some reduction in sodium sulfate content can be obtained under these circumstances. The water miscible organic liquids employed in preparing the above sols preferably consist of carbon, hydrogen and oxygen atoms, and are substantially neutral. Examples of suitable liquids which may be used include methanol, ethanol, isopropanol, tertiary butyl alcohol, acetone, methylethyl ketone and the like.

The acidic silica hydro-organosol as prepared according to the procedure discussed in the preceding description contains about 0.075% by weight or more of a salt or salts such as sodium sulfate and these hydro-organosols per se are not always satisfactory for preparing stable, alkaline, silica aquasols containing from about 45% to about 52% by weight or more of silica. Before such hydro-organosol can be used successfully in preparing the concentrated sols the residual salt content must be reduced to about 0.01% to about 0.14% by weight of the sol. A variety of procedures may be used for accomplishing this result. A preferred procedure is described in U.S. Patent 3,051,657, patented Aug. 28, 1962, by Wilson H. Power. In accordance with this Power patent the acidic silica hydro-organosol is contacted with a water insoluble strong cation exchange material which is capable of exchanging hydrogen ions for metallic cations in an acidic hydro-organosol whereby the metallic cations of the salt in such sol are taken up by the cation exchange material which releases hydrogen ions to the sol; thereafter contacting the sol with the water insoluble base form of a water insoluble weak anion exchange material having a plurality of salt forming nitrogen atoms which material is capable of absorbing mineral acid anions from an acidic hydro-organosol. The contact between such materials and the acidic hydro-organosol is maintained until the sol contains less than 0.15% by weight of salt or salts and has a pH in the range of 2.5 to 4.5 preferably 3.0 to 4.0. The hydro-organosol can be contacted with the anion exchange material in any sequence, including simultaneously, providing the pH of the sol does not exceed 4.5.

Alternatively the acidic silica hydro-organosol employed to form the starting sols employed in the processes of this invention may be prepared by completely de-ionizing the hydro-organosol by contacting the ion exchange materials with acidic silica hydro-organosol until the sol contains less than 0.01% by weight, e.g. sols such as those described in the Power application, and mixing such solution with the proper amount of unde-ionized or partially de-ionized sols, e.g. the sols described in Marshall or White, which contain from 0.1 to 0.6% by weight of salt in amounts such as to provide organosols having the desired salt concentration.

The processes of the Power patent above described can be modified somewhat, if desired, to produce other silica hydro-organosols which are suitable for use in the processes of the present invention. Thus, in one modification it is not necessary to employ ion exchange materials in such a manner as to reduce the salt content to as low as 0.01% or less by weight since sols having a salt content of from about 0.027% to about 0.14% may be used to produce the sols of the present invention. The hydro-organosols produced by the processes of the Power application have a reasonably good stability toward gelation when kept or stored at temperatures of 0° C. to 30° C. that is a stability for a time in excess of 12 hours and ordinarily in excess of 24 hours and sols having this stability are not essential for the purposes of the present process. Thus, sols having a shorter period of stability, for example, a stability toward gelation of 6 to 12 hours can be used. Such sols can be prepared by allowing the pH of the sols to rise up to 4.8 while in contact with the base form of the weak anion exchange material from which they must then be immediately separated. The resulting sol can then be employed without aging, that is, before appreciable change in viscosity occurs.

In accordance with one embodiment of a process of this invention any of the acidic silica hydro-organosols hereinbefore described having a Salt I content of from 0.027% to about 0.14% by weight may be converted to an alkaline sol by first adding the acidic hydro-organosol to an aqueous solution of an alkali metal silicate containing from about 0.5% to 2.5% by weight of $SiO_2$ and having a pH (glass electrode) of from about 10.5 to 11.3 at 25° C. The silicate solution is maintained at a temperature sufficiently high to cause removal, i.e. distillation of the organic liquid from the resulting mixture. The temperature of the resulting mixture is also maintained sufficiently high to remove or distill off the organic liquid as additional acidic hydro-organosol is added thereto; and after all of the acidic hydro-organosol is added distillation of organic liquid from the mixture is continued until substantially all of the organic liquid is removed from the mixture. Sufficient water is then removed by evaporation to provide a final aquasol having the silica, mineral acid salts and silicate salts in the concentrations hereinbefore defined. The amounts of acidic hydro-organosol and aqueous solution of alkali metal silicate employed may vary widely but the amount of alkali metal silicate should be an amount sufficient to provide the desired concentration of substantially ionic silicate (e.g. $SiO_2$ in the form of alkali metal silicate) dissolved in the aqueous phase of the final sol.

The above process can be adapted to produce the two groups of sols hereinbefore described. Thus, alkaline silica aquasols of high concentration which contain small colloidal silica particles in the range of from about 15 to about 30 millimicrons as measured from electron micrographs of a dried residue formed from such sols which have been diluted to a silica content of 0.01% or sols which contain colloidal silica particles having an average particle size in the range of from about 35 to about 75 millimicrons and which are cloudy may be produced by the above-described processes. The clarity of the final sol is measured by the ability to read an eight point newsprint through a certain depth of the sol, or by its extinction coefficient, and can be controlled consistently in accordance with the processes of this invention by controlling the silica concentration of the aqueous solution of alkali metal silicate employed in making the sol. Thus, if a clear sol having colloidal silica particles of relatively small size is desired an aqueous solution of alkali metal silicate containing from about 0.5 to about 1.3% by weight of $SiO_2$ is employed. Under such circumstances the final sol has a clarity such that an eight point newsprint can be read through a six inch or greater depth of the sol under ordinary light and the sol has an extinction coefficient less than 0.025.

The extinction coefficient is determined according to the following formula:

$$E = \frac{1}{PL} \log_{10}\left(\frac{I_0}{I}\right)$$

were E is the extinction coefficient, L is the light path in centimeters, $$\log_{10}\left(\frac{I_0}{I}\right)$$

is the absorption of optical density of the system for a given wave length and P is the percent solids. The extinction coefficient values contained herein were determined from the above formula using readings obtained from a Beckman model DU spectrophotometer with one centimeter cells and using light having a wave length of 325 millimicrons.

The average particle size of the colloidal silica in such sols is usually between about 15 and about 30 millimicrons as measured from electron micrographs in a manner discussed above. The particles may be composed of ultimate single particles or agglomerates of such particles.

If cloudy or turbid sols, that is, sols containing particles having an average particle size in the range of from about 35 to about 75 millimicrons, are desired, it is possible to consistently prepare such sols by the processes of the present invention by using an aqueous solution of a metal silicate preferably an alkali metal silicate containing in excess of 1.3% and up to 2.5% by weight of $SiO_2$. If the silica concentration is 1.3% and lower the sols obtained are of small particle size whereas if the silica concentration of the silicate solution is in excess of 2.5% the sols produced tend to have rather poor stability toward gelation. Under the conditions specified above, the final silica aquasols usually have colloidal particles averaging from about 35 millimicrons to about 75 millimicrons, an extinction co-efficient of 0.025 and higher and a readability less than six inches in depth. The amount, i.e. the volume, of alkali metal silicate of either of the above-defined solution concentrations which is employed is somewhat greater than the amount of metal silicate employed in prior art sols for example the sols disclosed in U.S. Patent 2,573,743, issued Nov. 6, 1951, to Henry S. Trail. Such volumes of silicate will be discussed in detail hereinafter.

Various metal silicates can be used although alkali metal silicates for example sodium and potassium silicates having an $SiO_2:M_2O$ ratio within the range of 1:1 to 3.6:1, where M is an alkali metal cation, and provided that the aqueous solution thereof has the silica concentration hereinbefore described, may be employed. The preferred alkali metal silicate is sodium silicate particularly a sodium silicate having an $SiO_2:Na_2O$ mol ratio in the range of 2.15:1 to about 3.5:1 or specifically a mol ratio within the range of 3.0:1 to 3.4:1.

In adding the acidic silica hydro-organosol to the aqueous solution of alkali metal silicate the rate of addition is not too important provided that the organic liquid in the mixture distills from the mixture during the addition. However, the addition should be effected with sufficient agitation to provide a mixture having a uniform or a substantially uniform composition and should be preferably added below the surface of the alkali metal silicate solution in order to avoid the formation of relatively large (visible) flocs of silica. As pointed out previously, the aqueous solution of alkali metal silicate should be at a temperature sufficiently high to cause distillation of the organic liquid present in the acidic hydro-organsol which is added to it. This temperature will vary to some extent depending upon the particular organic liquid present and whether the addition is carried out at atmospheric or subatmospheric pressure but is usually in excess, preferably from 5° C. to 10° C. in excess, of the boiling point of such organic liquid at the pressure used. Usually the addition and distillation is carried out at atmospheric pressure but it can be carried out at sub-atmospheric pressure and as a consequence at lower temperatures. However, the pressure employed should be such that the temperature of the aqueous solution of alkali metal silicate necessary to distill off organic liquid is above about 70° C. It has also been found important to maintain the temperature of the mixture formed by the addition of the acidic hydro-organosol to the aqueous alkali metal silicate solution, which mixture comprises water, silica and alkali metal silicate, at a temperature sufficiently high to distill off the organic liquid at the pressure employed, at least until the addition of the acidic hydro-organosol is completed. Thereafter, the remaining organic liquid present in the mixture is removed by evaporation, preferably by distillation, and sufficient water is removed by evaporation to provide a final low viscosity sol having a silica concentration of from about 39% to about 52% by weight. The evaporation of water can be carried out by distilling the water from the sol at atmospheric or lower pressure at the boiling point of the sol or at lower temperatures.

The amount of acidic silica hydro-organosol added to the starting aqueous metal silicate solution is generally less than the amount of the sol added to the same quantity of silicate solution in the preparation of prior art silica sols. Stated differently the ratio of acidic silica hydro-organosol volume to aqueous metal silicate volume will be such that more aqueous silicate is employed.

Generally from about 1.4 to about 4.7 volumes of salt containing acidic silica hydro-organosol per volume of aqueous metal silicate solution containing from about 0.5 to about 2.5% $SiO_2$ may be employed in the above-described processes. When it is desired to produce clear sols, from about 1.4 to about 3.8 volumes of salt-containing acidic silica hydro-organosol is mixed with one volume of an aqueous metal silicate solution containing from about 0.5% to about 1.3% by weight of $SiO_2$ and having an $SiO_2:M_2O$ ratio of from about 2.5:1 to about 3.5:1 where M is an alkali metal. When it is desired to produce milky sols from about 2.6 to about 4.7 volumes of salt containing silica hydro-organosols are mixed with one volume of aqueous metal silicate solution containing from about 1.4 to about 2.5% by weight of $SiO_2$ and having the above-described $SiO_2:M_2O$ ratio.

A further understanding of the processes of this invention will be obtained from the following specific examples which are intended to illustrate the present invention, but not to limit the scope thereof, parts and percentages being by weight unless otherwise specified.

*Example I*

An alkaline silica aquasol having the following properties was prepared in accordance with the teaching of Example III of the Trail patent.

$SiO_2$ ---------------------------------percent-- 30.1
$Na_2SO_4$ ------------------------------do---- 0.03
pH (glass electrode) at 25° C. ------------------ 9.61
Viscosity at 25° C. ----------------centipoises-- 7.3
Particle size --------------------millimicrons-- 20

To 1200 grams of such sol there was added 1.68 grams of anhydrous sodium sulfate and 0.2 gram of anhydrous crystalline sodium silicate ($Na_2SiO_3$). The sol was stirred until these metal salts had completely dissolved. Thereafter, the resulting sol to which the sols had been added was heated in vacuo at a pressure of 20 millimeters of mercury until 480 milliliters of water had been removed. A silica sol containing 50% by weight of colloidal silica having a specific gravity of 1.37, a viscosity of 17 centipoises at 25° C., a pH of 9.3, an $Na_2SO_4$ content of 0.283% representing 0.08 equivalent of $Na_2SO_4$ per liter in the aqueous phase, 0.055% sodium silicate, based on the water phase of the sol and a specific conductance of 5960 micromhos at 25° C. was obtained. When sodium hydroxide was used instead of sodium silicate in the above-described process the resulting sol although it had the same initial pH and relative viscosity upon standing for seven days underwent an increase in viscosity such that it could not be poured from the glass container in which it was stored. During the same period the viscosity of the sol prepared as in Example I remained unchanged at 17 centipoises at 25° C.

*Example II*

The procedure of Example I was repeated except that potassium sulfate and potassium silicate were added to the sol during the distillation but after about 250 milliliters of water had been distilled from the sol. A sol consisting substantially of the same silica concentration and which had a potassium sulfate concentration and potassium silicate concentration comparable to the sulfate and silicate concentration of Example I was obtained.

Example III

One and seventy-six hundredths gallons of an acidic silica ethanol aquasol at a temperature of 20° C. and having a specific gravity of 0.95, a silica content of 9.3% as silicic acid, an ethanol content of 51.88%, a sodium sulfate content of 0.26% and containing sufficient sulfuric acid to provide a pH of 3.2 glass electrode and the remainder consisting of water, was purified of larger particles by filtration through a sand bed filter. The filtered sol was then passed downwardly through a column two inches in diameter and thirty-two inches high which contained particles of the hydrogen or acid form of "Amberlite" IR–120 (a strong cation exchange resin consisting of water insoluble beads of a copolymer of styrene and divinylbenzene, which copolymer contains nuclear sulfonic acid groups) at the rate of 0.06 gallon per minute. The resin employed has a capacity of 4.25 milligram equivalents per gram. By this treatment the pH of the ethanol aquasol was lowered to about 1.92 (glass electrode) and this effluent was substantially free of sodium ions. The effluent from the cation exchange resin was placed in a glass container and was vigorously stirred while particles of the base form of "Amberlite" IR–45 (a weak anion exchange resin) were added using 100 grams of dry resin per gallon of sol. This resin which had a capacity of 6.0 milligram equivalents per gram consisted of water insoluble beads of a styrene-divinylbenzene copolymer containing a plurality of polyalkylamine groups. The resulting mixture was vigorously stirred for 40 minutes and the resin particles were then filtered out leaving the ethanol alcosol containing 0.0412% of salt that is salt consisting of sodium ions and sulfuric acid anion such as $SO_4^=$ or $HSO_4^-$ or both. One and seventy-six hundredths gallons of the sol as prepared above were added to three-fourths of a gallon of an aqueous solution of sodium silicate having an $SiO_2:Na_2O$ ratio of 3.25:1 and a pH (glass electrode) of 10.9 at 25° C., which silicate solution was initially at a temperature of 95° C. in a jacketed kettle provided with a condenser and stirrer. The sol was added to the silicate solution with vigorous agitation at atmospheric pressure and at the rate of 0.179 gallon per hour. During the addition of the sol ethanol was distilled from the kettle at atmospheric pressure and steam was passed through the jacket of the kettle at a temperature sufficient to provide a temperature in the contents of the kettle of 87° C. when all the sol had been added. The distillation of ethanol from the kettle at atmospheric pressure was continued and the temperature of the contents of the kettle were raised to 100° C. at atmospheric pressure to distill off water from the mixture until the $SiO_2$ content was 50%. A total of 2.3 gallons of distillate was collected at an average rate of 0.2 gallon per hour, the rate being higher during the addition of the acidic ethanol aquasol but dropping off as the ethanol was depleted from the mixture in the kettle by distillation. The final product in the kettle contained less than 0.1% by volume of mud or settleable solids and was centrifuged to remove the large particle solid materials. The final product was an alkaline silica aquasol which was stable for six months and longer at temperatures of from 5° C. to 30° C. and which had the following characteristics.

| | |
|---|---|
| Total solids (percent by wt.) | 49 |
| Specific gravity (25° C.) | 1.375 |
| pH (glass electrode) at 25° C. | 9.3 |
| $Na_2SO_4$ (percent) | 0.217 |
| Equivalent of $Na_2SO_4$ per liter of water | 0.060 |
| Sodium silicate (percent) | [1] 0.2 |
| Average particle size (millimicrons) | 25 |
| Viscosity (cps. at 25° C.) | 15 |

[1] Based on the volume of the aqueous phase.

Example IV

A sol having characteristics similar to those described in Example III was prepared in the manner described in that Example III by using 1.63 gallons of an identical acidic silica ethanol aquasol having a pH of 3.3. The final silica aquasol had a pH of 9.49, an $Na_2SO_4$ content of 0.209% corresponding to 0.058 equivalent of $Na_2SO_4$ per liter of aqueous phase and containing 0.3% by weight of sodium silicate, based on the aqueous phase and a viscosity at 25° C. of 16 centipoises.

Example V

Two gallons of an acidic ethanol aquasol identical with that described in Example III and containing 0.892% by weight of salt, that is a salt of sodium ions and sulfuric acid ions as $SO_4^=$ or $HSO_4^-$ or both were added to 2519 milliliters of an aqueous solution of sodium silicate containing 2.27% of $SiO_2$ and having a pH (glass electrode) of 11.1 at 25° C. which silicate solution was initially at a temperature of 95° C., in a jacketed kettle provided with a condenser and stirrer. The sol was added to the silicate solution with vigorous agitation at the rate of one-half gallon per hour. During the addition of the sol the ethanol was distilled from the kettle at atmospheric pressure and steam was applied to the jacket of the kettle at a temperature sufficient to provide a temperature in the contents of the kettle of about 86° C. when all of the sol had been added. Distillation of ethanol from the kettle at atmospheric pressure was continued and the temperature of the contents of the kettle was raised to 100° C. to distill off water from the mixture until the $SiO_2$ content was about 40%. The contents of the kettle were cooled and centrifuged to remove mud or large particles of flocculated silica which were present in an amount of about 3% by volume. The resulting product was a cloudy alkaline silica aquasol which was stable for six months and longer at a temperature of from about 5 to about 30° C. and had the following characteristics.

| | |
|---|---|
| Total solids percent by wt. | 40 |
| Specific gravity at 25° C. | 1.287 |
| Viscosity (centipoises at 25° C.) | 8 |
| pH | 9.6 |
| Equivalent $Na_2SO_4$ per liter of water | 0.09 |
| Sodium silicate percent | [1] 0.6 |
| Specific conductance micromhos at 25° C. | 5500 |
| Particle size millimicrons | 55 |

[1] Based on the liquid phase.

What is claimed is:

1. A stable alkaline colloidal silica sol having a viscosity below about 35 centipoises at 25° C. and consisting essentially of (1) a colloidal silica disperse phase consisting substantially of from about 39% to about 52% by weight, based on the weight of the sol, of amorphous silica particles having an average particle size in the range of from about 15 to about 75 millimicrons and (2) a continuous liquid phase comprising an aqueous solution having dissolved therein (a) from 0.055 to about 0.095 equivalent, per liter of said liquid phase, of a water soluble metal salt selected from the group consisting of water soluble metal chlorides, sulfates, nitrates, phosphates and carbonates and (b) an amount sufficient to provide in said sol a pH of from about 8.8 to about 9.9 of a water soluble salt consisting of a metal cation and a silicon oxide containing anion.

2. A silica sol as in claim 1, wherein said water soluble metal salt is an alkali metal sulfate.

3. A silica sol as in claim 1, wherein the water soluble salt consisting of a metal cation and a silicon oxide containing anion is an alkali metal silicate.

4. A stable alkaline colloidal silica sol having a viscosity of from about 7 to about 31 centipoises at 25° C. consisting essentially of (1) a colloidal silica disperse phase consisting of from about 39% to about 52% by weight, based on the weight of the sol, of amorphous silica particles having an average particle size in the range of from about 15 to about 30 millimicrons, and (2) a continuous liquid phase comprising an aqueous solution having dissolved therein (a) from 0.055 to about 0.095 equivalent, per liter of said liquid phase, of a water soluble alkali metal salt selected from the group consisting of water soluble alkali metal chlorides, sulfates, nitrates, phosphates, and carbonates and (b) an amount sufficient to provide in said sol a pH of from about 8.8 to about 9.5 of sodium silicate.

5. A silica sol as in claim 4, wherein said water soluble alkali metal salt is sodium sulfate.

6. A stable alkaline colloidal silica sol having a viscosity of from about 7 to about 20 centipoises at 25° C. consisting essentially of (1) a colloidal silica disperse phase consisting of from about 39% to about 52% by weight, based on the weight of the sol, of amorphous silica particles having an average particle size in the range of from about 35 to about 75 millimicrons, and (2) a continuous liquid phase comprising an aqueous solution having dissolved therein (a) from 0.055 to about 0.095 equivalent, per liter of said liquid phase, of an alkali metal salt selected from the group consisting of water soluble alkali metal chlorides, sulfates, nitrates, phosphates, and carbonates and (b) an amount sufficient to provide in said sol a pH of from about 9.3 to about 9.9 of sodium silicate.

7. A silica sol as in claim 6, wherein said water soluble alkali metal salt is sodium sulfate.

8. A process of preparing a concentrated, stable, alkaline silica sol of low viscosity which comprises removing liquid from an alkaline silica sol containing from about 5% to about 35% by weight of colloidal silica particles having a particle size in the range of from about 15 to about 75 millimicrons, said particles being dispersed in liquid aqueous medium having dissolved therein (1) a water soluble metal salt selected from the group consisting of water soluble metal chlorides, sulfates, nitrates, phosphates, and carbonates, which salt is present in an amount to provide, after the removal of said liquid, an alkaline silica sol of about 39% to about 52% by weight of said colloidal silica particles and an aqueous phase in which said salt is dissolved containing from 0.055 to about 0.095 equivalent, per liter of said aqueous phase, of said salt and (2) in addition to said salt, a water soluble salt consisting of a metal cation and a silica oxide containing anion, which last mentioned salt is dissolved in said medium in an amount sufficient to provide, after removal of said liquid, a silica sol end product having a pH of from about 8.8 to about 9.9, whereby sufficient liquid is removed to provide a stable alkaline silica sol containing from about 39% to about 52% by weight of said colloidal silica particles and having a viscosity below about 35 centipoises at 25° C.

9. A process as in claim 8, wherein the silica particles have a particle size in the range of from about 15 to about 30 millimicrons.

10. A process as in claim 8, wherein the silica particles have an average particle size in the range of from about 35 to about 75 millimicrons.

11. A process which comprises adding an acidic silica hydro-organosol containing from about 5% to about 12% by weight of silica as silicic acid and a substantially neutral water miscible organic liquid consisting of carbon, hydrogen and oxygen atoms and having a boiling point below that of water at atmospheric pressure and containing from about 0.027% to about 0.14% by weight of a water soluble metal salt selected from the group of water soluble metal chlorides, sulfates, nitrates, phosphates, and carbonates to an equeous alkali metal silicate solution containing from about 0.5% to about 2.5% by weight of SiO₂ and having a pH (glass electrode) of from about 10.5 to 11.3 at 25° C., said silicate solution being at a temperature sufficiently high prior to and during the addition of said acidic sol to boil the resulting mixture, distilling off said organic liquid from the resulting mixture during and after the addition of said acidic sol and subsequently evaporating water until an alkaline silica aquasol containing from about 39% to about 52% by weight of silica is obtained, said silica consisting of amorphous particles having a particle size in the range of from about 15 to about 75 millimicrons, the total quantity of aqueous alkali metal silicate solution employed being sufficient to provide a final silica aquasol having a pH of from about 8.8 to about 9.9; said final silica aquasol being further characterized by having a viscosity of below 35 centipoises at 25° C.

12. A process which comprises adding acidic silica hydro-organosol containing from about 5% to about 12% by weight of silica as silicic acid, from about 25% to about 60% by weight of a substantially neutral, water miscible organic liquid consisting of carbon, hydrogen and oxygen atoms and having a boiling point below that of water at atmospheric pressure and from about 0.027% to about 0.14% by weight of an alkali metal sulfate, the remainder consisting substantially of water and sulfuric acid in an amount sufficient to provide a pH of about 2.0 to about 4.8, to an aqueous alkali metal silicate solution containing from about 0.5 to 2.5% by weight of SiO₂ and having a pH (glass electrode) of 10.5 to 11.3 at 25° C., said silicate solution prior to and during the addition of said acidic sol being at a temperature sufficiently high to boil the resulting mixture, said temperature being about 70° C., distilling off said organic liquid from the resulting mixture during and after the addition of said acidic sol and subsequently evaporating water until a final silica aquasol containing from about 39% to about 52% by weight of silica is obtained, said silica consisting of amorphous particles having a particle size in the range of from about 15 to about 75 millimicrons, the total quantity of aqueous alkali metal silicate solution employed being sufficient to provide a final silica aquasol having a pH of from about 8.8 to about 9.9; said final silica aquasol being further characterized by having a viscosity below 35 centipoises at 25° C.

13. A process as in claim 12, but further characterized in that the hydro-organosol is an ethanol aquasol.

14. A process as in claim 12, but further characterized in that said alkali metal silicate is sodium silicate.

15. A process which comprises adding an acidic silica hydro-organosol containing from about 5% to about 12% by weight of silica as silicic acid, a substantially neutral water miscible organic liquid consisting of carbon, hydrogen and oxygen atoms and having a boiling point below that of water at atmospheric pressure and from about 0.027% to about 0.14% by weight of a water soluble metal salt selected from the group consisting of water soluble metal chlorides, sulfates, phosphates, and carbonates to an aqueous alkali metal silicate solution containing from 0.5 to 1.3% by weight of SiO₂ and having a pH (glass electrode) of 10.5 to 11.1 at 25° C., which silicate solution prior to and during the addition of acidic sol is at a temperature sufficiently high to boil the resulting mixture, distilling off said organic liquid from the resulting mixture during and after the addition of said acidic sol and subsequently evaporating water until a final silica aquasol containing from about 39% to about 52% by weight of silica is obtained, said silica consisting of amorphous particles having a particle size in the range of from about 15 to about 30 millimicrons, the total quantity of aqueous alkali metal silicate solution employed being sufficient to provide a final silica aquasol having a pH of from about 8.8 to about 9.5; said final silica aquasol being further characterized by having a viscosity of from about 7 to about 31 centipoises at 25° C.

16. A process as in claim 15, but further characterized in that the hydro-organosol is an ethanol aquasol, the water soluble metal salt is an alkali metal sulfate and the alkali metal silicate is sodium silicate.

17. A process which comprises adding an acidic silica hydro-organosol containing from about 5% to about 12% by weight of silica as silicic acid, a substantially neutral water miscible organic liquid consisting of carbon, hydrogen and oxygen atoms and having a boiling point below that of water at atmospheric pressure and from about 0.027% to about 0.14% by weight of a water soluble metal salt selected from the group consisting of water soluble metal chlorides, sulfates, phosphates, and carbonates to an aqueous alkali metal silicate solution containing from about 1.4 to about 2.5% by weight of $SiO_2$ and having a pH (glass electrode) of 11.1 to 11.3 at 25° C., said silicate solution prior to and during the addition of said acidic sol being at a temperature sufficiently high to boil the resulting mixture, distilling off said organic liquid from the mixture during and after the addition of said acidic sol, subsequently distilling off water until a final silica aquasol containing from about 39% to about 52% by weight of silica is obtained, said silica consisting of amorphous particles having a particle size in the range of from about 35 to about 75 millimicrons, the total quantity of aqueous alkali metal silicate solution employed being sufficient to provide a final silica aquasol having a pH of from about 9.3 to about 9.9; said final silica aquasol being further characterized by having a viscosity of from about 7 to about 20 centipoises at 25° C.

18. A process as in claim 17, but further characterized in that said hydro-organosol is an ethanol aquasol, said water soluble metal salt is an alkali metal sulfate and said alkali metal silicate is sodium silicate.

References Cited

UNITED STATES PATENTS

| | | | |
|---|---|---|---|
| 2,515,949 | 7/1950 | Di Maio | 252—317 |
| 3,012,973 | 12/1961 | Atkins | 252—313 |

LEON D. ROSDOL, *Primary Examiner.*

R. D. LOVERING, *Assistant Examiner.*